United States Patent
Kwok et al.

(10) Patent No.: US 12,495,437 B2
(45) Date of Patent: Dec. 9, 2025

(54) EFFICIENT RANDOM ACCESS CHANNEL (RACH) PROCEDURE DETERMINATION

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 440 days.

(21) Appl. No.: 17/232,372

(22) Filed: Apr. 16, 2021

(65) Prior Publication Data

US 2022/0338248 A1  Oct. 20, 2022

(51) Int. Cl.
| | |
|---|---|
| *H04W 74/00* | (2009.01) |
| *G06N 20/00* | (2019.01) |
| *H04W 28/02* | (2009.01) |
| *H04W 74/0833* | (2024.01) |
| *H04W 74/0836* | (2024.01) |

(52) U.S. Cl.
CPC .......... *H04W 74/002* (2013.01); *G06N 20/00* (2019.01); *H04W 28/0284* (2013.01); *H04W 74/0833* (2013.01); *H04W 74/0836* (2024.01)

(58) Field of Classification Search
CPC ........... H04W 74/008; H04W 28/0284; H04W 74/0833; G06N 20/00
USPC ....................................................... 370/329
See application file for complete search history.

(56) References Cited

U.S. PATENT DOCUMENTS

| | | | |
|---|---|---|---|
| 2018/0110074 A1* | 4/2018 | Akkarakaran | .... H04W 74/0833 |
| 2019/0110254 A1* | 4/2019 | Yerramalli | .............. H04L 1/001 |
| 2019/0357267 A1* | 11/2019 | Martin | .............. H04W 74/0833 |
| 2020/0229241 A1* | 7/2020 | Jeon | .................. H04W 74/0833 |
| 2020/0236726 A1 | 7/2020 | Lee et al. | |
| 2022/0030640 A1* | 1/2022 | Shi | ....................... H04W 52/146 |

(Continued)

FOREIGN PATENT DOCUMENTS

| | | | |
|---|---|---|---|
| CA | 3096830 A1 | 9/2020 | |
| EP | 3697167 A1 * | 8/2020 | ........ H04W 74/0836 |

(Continued)

OTHER PUBLICATIONS

EP 3697167 A1 (Year: 2020).*

(Continued)

*Primary Examiner* — Faruk Hamza
*Assistant Examiner* — Jean F Voltaire
(74) *Attorney, Agent, or Firm* — Lee & Hayes, P.C.

(57) ABSTRACT

Techniques for determining a random access channel (RACH) procedure to use to establish an uplink connection between a user equipment (UE) and a base station are discussed herein. In some cases, when a UE is in an idle state, the UE may determine a network condition, a UE condition, or other conditions. Based on the determined conditions, the UE may select or otherwise determine to use a two-step RACH procedure or a four-step RACH procedure. In some cases, the determination of which RACH procedure to use can be based on a machine learned model, heuristic(s), rule(s), threshold(s), and the like. Based on the selection, the UE may initiate a communication with the base station using the particular RACH procedure.

18 Claims, 5 Drawing Sheets

(56) References Cited

U.S. PATENT DOCUMENTS

2022/0086917 A1* 3/2022 Lei ..................... H04W 64/006
2022/0217781 A1* 7/2022 Decarreau ................ G06N 3/08

FOREIGN PATENT DOCUMENTS

WO     WO2018085726 A1     5/2018
WO     WO2020034319 A1     2/2020

OTHER PUBLICATIONS

Extended European Search Report mailed Jul. 19, 2022 for European Patent Application No. 22164428.9, 9 pages.
Examination Report for European Application No. 22164428.9, Dated Feb. 14, 2025, 11 pages.

* cited by examiner

```
┌─────────────────────────────────────────────────┐
│ DETERMINE, BY A USER EQUIPMENT (UE) IN AN IDLE  │
│          STATE, A NETWORK CONDITION OR A UE     │
│                    CONDITION                    │
│                      502                        │
└─────────────────────────────────────────────────┘
                        │
                        ▼
┌─────────────────────────────────────────────────┐
│ DETERMINE, AS A DETERMINATION AND BASED ON THE  │
│ NETWORK CONDITION OR THE UE CONDITION, TO USE   │
│           A 2-STEP RACH OR A 4-STEP RACH        │
│                      504                        │
└─────────────────────────────────────────────────┘
                        │
                        ▼
┌─────────────────────────────────────────────────┐
│ INITIATE A DATA TRANSMISSION OPERATION BETWEEN  │
│  THE UE AND A NEW RADIO BASE STATION BASED ON   │
│               THE DETERMINATION                 │
│                      506                        │
└─────────────────────────────────────────────────┘
```

FIG. 5

EFFICIENT RANDOM ACCESS CHANNEL (RACH) PROCEDURE DETERMINATION

BACKGROUND

Modern wireless networks use a random access channel (RACH) as a shared channel by which wireless devices may access a mobile network. Recent proposals for Fifth Generation (5G) networks suggest using a two-step RACH procedure to establish uplink synchronization and/or a Radio Resource Control (RRC) connection. This two-step RACH procedure represents reduced latency and signaling compared to a four-step RACH procedure. However, there may be cases where the use of the four-step RACH procedure may be advantageous.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for determining a random access channel (RACH) procedure to use to establish an uplink connection between a user equipment (UE) and a base station are discussed herein. In some cases, when a UE is in an idle state, the UE may determine one or more network condition(s) and/or UE condition(s). Based on the network condition(s) and/or the UE condition(s), the UE may select or otherwise determine to use a two-step RACH procedure or a four-step RACH procedure. Based on the selection, the UE may initiate a communication with the base station using the particular RACH procedure.

In some instances, an example of a network condition includes, but is not limited to, a level of congestion in a physical RACH channel of a wireless resource, a wireless resource type (e.g., frequency range(s), spectrum usage techniques (e.g., time division duplex (TDD), frequency division duplex (FDD), etc.), location information (e.g., a location of the base station and/or UE, an estimated distance between the UE and the base station, etc.), a base station identifier (e.g., a last known identifier), and the like. In some examples, the network condition can be determined by the UE "listening" to the physical RACH channel to determine a frequency of signaling, a signal strength, activity, noise, etc. In some examples, a decision whether to determine network conditions can be based on other factors, such as a time of day, UE condition(s), output of a machine learned model, and the like.

In some examples, in the context of determining network condition(s), a timing advance of a signal from a base station within the physical RACH channel can be used to estimate a distance between the UE and the base station. In some examples, the estimated distance between the UE and the base station can be used to determine a threshold level of activity or congestion, which can be used to determine whether to use a two-step RACH procedure or a four-step RACH procedure.

In some instances, an example of a UE condition includes, but is not limited to, a size of data to be transmitted during a RACH procedure, a type of data (e.g., MMS, SMS, audio, video, data, etc.), a device type (e.g., make/model, operating system, a URLLC (ultra-reliable low-latency communication) device, etc.), an application associated with data to be sent, a charge level associated with the UE (e.g., battery level, whether the UE is charging or discharging, etc.), whether a display is active, whether a user is picking up the UE (e.g., based on accelerometer data or light data, etc.), and the like.

In some examples, one or more of the network condition(s) and/or the UE condition(s) can be input to a machine learned model trained to select or determine a RACH procedure. In some examples, a machine learned model can make a determination whether to determine either the network condition(s) and/or the UE condition(s). In some examples, one or more heuristics can be used in addition or instead of a machine learned model to determine a RACH procedure to use.

In some examples, a two-step RACH procedure (also referred to as a 2-step RACH procedure or a 2-step RACH) can include a first message from a UE to a base station comprising a first RACH preamble and content data and a second message from the base station to the UE comprising an acknowledgement of the first message.

In some examples, a four-step RACH procedure (also referred to as a 4-step RACH procedure or a 4-step RACH) comprises a first message from the UE to the base station comprising a RACH preamble, a second message from the base station to the UE comprising an uplink transmission resource allocation, a third message from the UE to the base station comprising content data, and a fourth message from the base station to the UE comprising an acknowledgment of receiving the third message.

In some examples, a UE initiating a two-step RACH procedure may not receive an acknowledgement, in which case the UE can determine that the two-step RACH was unsuccessful. In such a case, the UE can determine whether to retry, whether to use a two-step RACH procedure or a four-step RACH procedure, a time period to delay a retry, a number of retries, and the like.

In some examples, the RACH procedure determination techniques discussed herein can provide improvements to the functioning of computing devices and a network. For example, the use of a two-step RACH procedure reduces latency in communications and reduces an amount of energy used to transmit information by a UE. Further, the reduction of the number of messages relative to a four-step RACH procedure reduces an amount of signaling by and between components of the network. The use of heuristics, machine learned models, or other rule-based decision processes reduces the probability that the use of the two-step procedure will fail and that a UE may follow up with additional two-step procedures and/or additional four-step procedures. Accordingly, the reliability of transmitting messages may be improved. These and other improvements to the functioning of a computing device and/or network are discussed throughout this disclosure.

In some examples, the UE implementing the RACH procedure determination techniques may be a 5G-capable UE that is configured for standalone communication with a new radio (NR) base station.

In some examples, the techniques discussed herein can be implemented in the context of protocols associated with one or more of 3G, 4G, 4G LTE, and/or 5G protocols. In some examples, the network implementations can support standalone architectures, non-standalone architectures, dual connectivity, carrier aggregation, etc. Example implementations are provided below with reference to the following figures.

Figure 1:
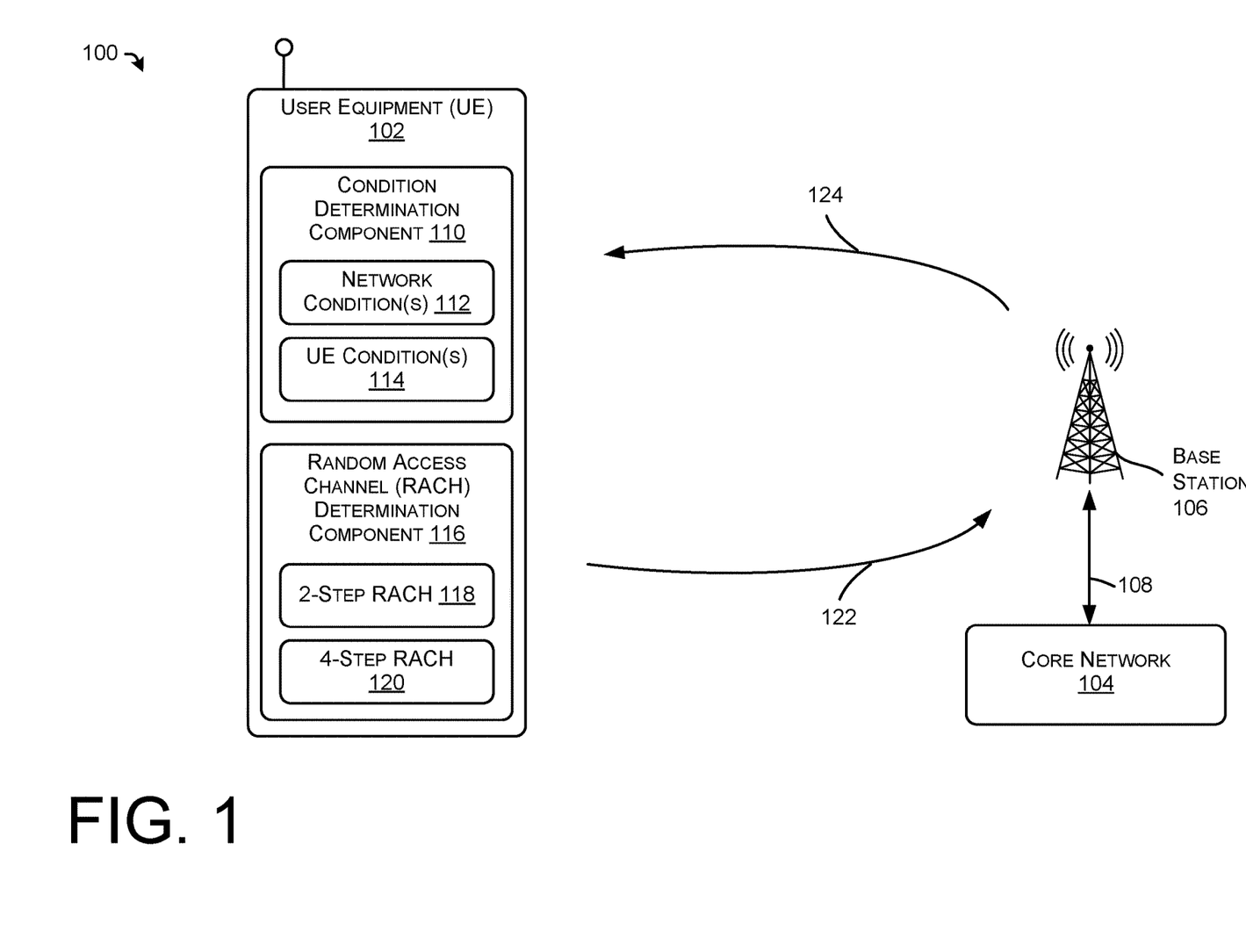
FIG. 1 shows an example network environment in which a UE can determine a RACH procedure based on network condition(s) and/or UE condition(s).

FIG. 1 shows an example network environment 100 in which a UE 102 can determine a RACH procedure based on network condition(s) and/or UE condition(s). The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The environment 100 can include a telecommunication network that can have one or more access networks that include base stations and/or other access points, as well as a core network 104 linked to the access network. The access networks and/or the core network 104 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more base stations or other access points of the access networks, and in turn be connected to the core network 104 via the base stations or other access points. In some examples, the core network 104 can be a packet core network of an LTE network, which may be referred to as an Evolved Packet Core (EPC). In other examples, the core network 104 can be a 5G core network.

The access networks can include a base station 106 that communicates with the UE 102 and the core network 104, as well as other UEs and other base stations not illustrated in FIG. 1. In some cases, the base station 106 may be associated with an LTE access network known as an Evolved UMTS Terrestrial Radio Access Network (E-UTRAN). Base stations of the LTE access network can be known as eNBs. In some cases, the base station 106 may be associated with a 5G access network with base stations known as gNBs or as new radio (NR) base stations.

The base station 106 can be connected to the core network 104. For example, the base station 106 may be connected to the core network 104 via S1 interface(s) 108, or other interfaces, for transmission of user plane data and/or control plane data. The base station 106 may also be connected to other base stations over an X2 interface, or other interface, for transmission of user plane data and/or control plane data.

The UE 102 can include a condition determination component 110 to determine network condition(s) 112 and/or UE condition(s) 114. In some example, the condition determination component 110 can provide data about one or more conditions to a random access channel (RACH) determination component 116 (and/or other components), which can use the data to determine whether to use a 2-step RACH 118 or a 4-step RACH 120 to initiate a communication with the base station.

The network condition(s) 112 can include, but are not limited to, a level of congestion in a physical RACH channel of a wireless resource relative to a threshold level (e.g., where the threshold is static or dynamic based on location, machine learning, heuristics or other rules, etc.), a wireless resource type (e.g., frequency range(s), spectrum usage techniques (e.g., time division duplex (TDD), frequency division duplex (FDD), etc.), location information (e.g., a location of the base station and/or UE, an estimated distance between the UE and the base station, etc.), a base station identifier (e.g., a last known identifier), and the like. In some examples, the network condition can be determined by the UE "listening" to the physical RACH channel to determine a frequency of signaling, a signal strength, etc. In some examples, a network condition may include, but is not limited to, signal-to-noise ratio (SNR) data, signal-to-interference plus noise ratio (SINR) data, and/or signal-to-noise plus distortion ratio (SNDR) data. In some examples, a decision whether to determine network conditions can be based on other factors, such as a time of day, UE condition, output of a machine learned model, and the like.

The UE condition(s) 114 can include, but are not limited to, a size of data to be transmitted during a RACH procedure, a type of data (e.g., MMS, SMS, audio, video, data, etc.), a device type (e.g., make/model, operating system, a URLLC (ultra-reliable low-latency communication) device, etc.), an application associated with data to be sent, or a charge level associated with the UE (e.g., battery level, whether the UE is charging or discharging, etc.), whether a display is active, whether a user is picking up the UE (e.g., based on accelerometer data or light data, etc.), and the like.

With respect a size of data be transmitted during a RACH procedure, the RACH determination component 116 can determine if a size of the data is below a threshold value (e.g., 100 bytes, 1 KB, 10 KB, 1 MB, etc.). If an amount of data is below a threshold the data may be transmitted with fewer resources, which may weigh in favor of using the 2-step RACH 118.

By way of example and without limitation, multiple data thresholds can be used to evaluate processing. For example, if data is below a first threshold the 2-step RACH 118 can be used without determining network condition(s). If a size of the data is above the first threshold but below a second threshold, network condition(s) can be determined, for example, by listening to activity in a physical RACH. If a size of the data is above a third threshold, the 4-step RACH 120 can be used without determining network condition(s). However, a size of data to be transmitted may be but one factor in selecting or determining a RACH procedure to use.

With respect to a charge level associated with the UE, such information may be considered when determining which RACH procedure to use. For example, when a probability of a successful 2-step RACH procedure is above a threshold (e.g., when a RACH congestion is below a threshold, based on a time of day, based on a size of data, based on a determination from a machine learned model, etc.), and a battery charge level is below a threshold, the RACH determination component 116 can determine to use the 2-step RACH 118 in order to conserve energy used in transmitting multiple message. In some examples, if a probably of a successful 2-step RACH procedure is below a threshold (e.g., based on one or more factors discussed herein) and a battery charge level is below a threshold, the RACH determination component 116 can determine to use the 4-step RACH 118 to minimize a collision and/or or retry attempts. Of course, a battery charge level may be but one factor in selecting or determining a RACH procedure to use.

In some examples, the 2-step RACH 118 (also referred to as a 2-step RACH procedure 118 or RACH 118) can include a first message from the UE 102 to the base station 106 comprising a first RACH preamble and content data and a second message from the base station 106 to the UE 102 comprising an acknowledgement of the first message. In some examples, the first message of the RACH 118 may be represented by uplink data 122, while the second message of the RACH 118 may be represented by downlink data 124.

In some examples, the 4-step RACH 120 (also referred to as a 4-step RACH procedure 120 or RACH 120) comprises a first message from the UE 102 to the base station 106 comprising a RACH preamble, a second message from the base station 106 to the UE 102 comprising an uplink transmission resource allocation, a third message from the UE 102 to the base station 106 comprising content data (e.g., sent within the transmission resource indicated in the second message), and a fourth message from the base station 106 to the UE 102 comprising an acknowledgment of receiving the third message. In some examples, the first message and the third message of the RACH 120 may be represented by the uplink data 122, while the second message and the fourth message of the RACH 120 may be represented by the downlink data 124.

In some examples, the RACH procedures discussed herein can be contention based RACH procedures whereby a RACH preamble is selected from a list of possible RACH preambles. In such a case, two UEs may select the same RACH preamble, which might result in a collision.

In some examples, the RACH determination component 116 can receive data from the condition determination component 110 (e.g., network condition(s) and/or UE condition(s)), time of day, day of week, events in an area (e.g., sporting events, network outages, indication of emergency events (e.g., natural disasters, medical emergencies, etc.), and the like, and can input the data into a machine learned model to determine a RACH procedure to use and/or to determine subsequent operations if an initial RACH procedure (e.g., a 2-step RACH procedure) is not successful. Additional details are discussed below in connection with FIG. 2, as well as throughout this disclosure.

In some cases, the UE 102 may determine which RACH procedure to use (or which RACH procedure not to use) based on a type of base station that the UE 102 will be communicating the subsequent uplink transmission. For example, the UE 102 can connect to one base station using a Fifth Generation (5G) New Radio (NR) connection and also connect to another base station using a Fourth Generation (4G) Long-Term Evolution (LTE) connection. The UE 102 may determine to utilize a 2-step RACH procedure (or may determine a RACH procedure as discussed herein) when the UE 102 is communicating with an NR base station and may determine to use a 4-step RACH procedure when the UE 102 is communicating with an LTE base station.

Dynamically determining which RACH procedure to use based on network condition(s), UE condition(s), and/or other conditions provides an efficient technique for reducing latency, improving power efficiency, and reducing signaling in a network, while reducing the probability of unsuccessful RACH procedure, and reducing the probability of subsequent failed RACH attempts.

Figure 2:
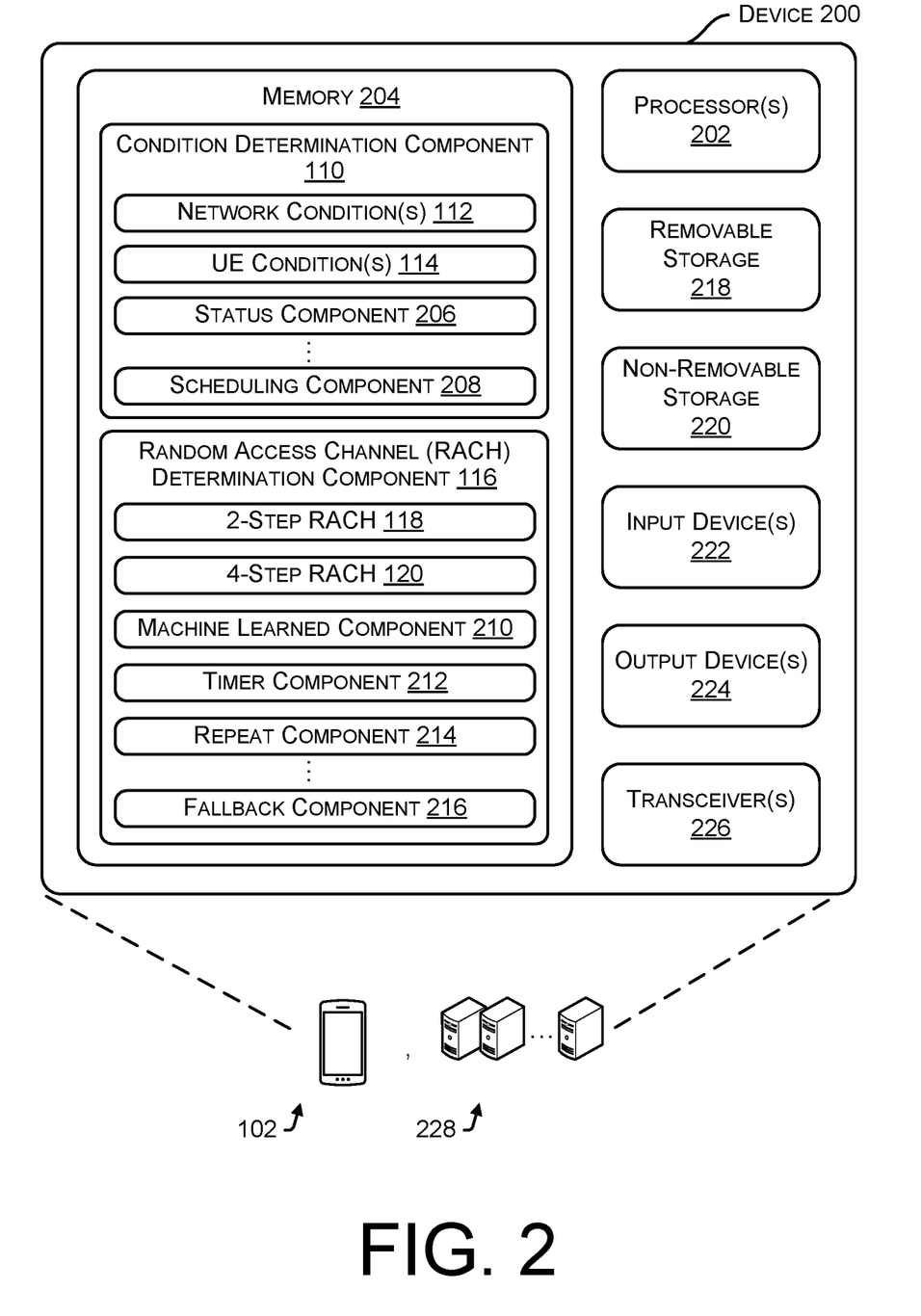
FIG. 2 is a block diagram of a device including a condition determination component and a RACH determination component.

FIG. 2 is a block diagram of a device 200 including a condition determination component and a RACH determination component. In some examples, the device 200 can be configured to implement the techniques discussed herein.

FIG. 2 shows only basic, high-level components of the device 200. Generally, the device 200 may comprise and/or may be implemented in any of various network components discussed herein, including those components illustrated in FIG. 1. For example, the device 200 may be implemented in the UE 102, the base station 106, which may include an eNB, a gNB, the core network 104, or other network device (e.g., a computing device 228).

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the condition determination component 110, which may include the network condition(s) 112, the UE condition(s) 114, a status component 206, and a scheduling component 208, and the random access channel (RACH) determination component 116, which may include the 2-step RACH 118, the 4-step RACH, a machine learned component 210, a timer component 212, a repeat component 214, and a fallback component 216.

As discussed herein, the condition determination component 110 can determine network condition(s), UE condition(s), and/or other conditions or aspects of an environment. Such condition(s) can be used to determine whether to determine other conditions and/or can be used to determine which RACH procedure to use. For example, a time of day and/or a size of data to be transmitted can be used to determine whether to determine a network condition such as a level of congestion (or activity) associated with a physical RACH. In some examples, initial conditions can be input to one or more models (e.g., machine learned models), rules, or heuristics, and can be used to determine whether to determine other conditions. Additional details of the condition determination component are provided throughout this disclosure.

As discussed herein, the network condition(s) 112 include aspects of the network that can be used to determine which RACH procedure to use. In some examples, determining network condition(s) can include listening to a RACH channel to determine a level of congestion or noise associated with particular wireless resources. Additional details of the network condition(s) 112 are provided throughout this disclosure.

As discussed herein, the UE condition(s) 114 can include aspects of the UE or data to be transmitted that can be used to determine which RACH procedure to be used. In some examples, UE conditions (or other conditions) may represent initial conditions that can be used to determine whether to determine other conditions (e.g., network condition(s)) before determining a particular RACH procedure to use. Additional details of the UE condition(s) 114 are provided throughout this disclosure.

The status component 206 can include functionality to determine whether the UE is in standalone mode associated with a 5G protocol or a 4G protocol. If the UE is in standalone mode with 5G, the UE may determine the RACH procedure as discussed herein. In some instances, when the UE is in standalone mode with the 4G, the UE may default to a 4-step RACH, for example. In some instances, the status component 206 can determine a time of day, a day of the week, holidays, special events (e.g., sports, arts, etc.), emergency events (e.g., natural disasters, medical emergencies, social events, etc.). In some examples, data from the status component 206 can be used to determine whether to determine other network condition(s) and/or UE condition(s), and/or can be used to determine, at least in part, a RACH procedure, as discussed herein.

The scheduling component 208 can include functionality to determine when to listen to the physical RACH channel to determine one or more network conditions. Further, in the event the scheduling component 208 determines to listen to a physical RACH channel, the scheduling component 208 can determine an amount of time to listen to the channel. For example, the scheduling component 208 can receiving information indicate of or otherwise determine a time of day, day of the week, size of data to be sent, battery state, and the like. By way of example, a time of day indicative of an early morning hour may suggest that there is a low likelihood of a RACH collision, and therefore the scheduling component 208 may determine not to listen to a RACH channel to determine network condition(s) from active listening of the channel. By way of another example, the scheduling component 208 can determine that a size of data to be sent via a RACH procedure is below a data threshold, in which case, the scheduling component 208 can determine that a probability of a RACH collision (e.g., an unsuccessful 2-step RACH) is below a threshold. In the event the size of data is above a data threshold, the scheduling component 208 can determine that it would be beneficial to determine a network condition based on listening to traffic on the RACH channel.

In some examples, the scheduling component 208 can be a machine learned model and/or based on heuristics or rules. For example, various condition(s) and/or time of day can be input to a machine learned model and the model can output a determination of whether the physical RACH should be sampled (listened) to determine network conditions.

As discussed herein, the RACH determination component 116 can receive indication(s) of network condition(s), UE condition(s), and other conditions to determine whether to use a 2-step RACH or a 4-step RACH, and/or what actions to follow if a RACH procedure is not successful. Additional details of the RACH determination component 116 are provided throughout this disclosure.

As discussed herein, the 2-step RACH 118 can represent a two-step procedure to efficiently transmit data on a random access channel of wireless network. Additional details of the 2-step RACH 118 are provided throughout this disclosure.

As discussed herein, the 4-step RACH 120 can represent a four-step procedure to reliability transmit data on a random access channel of wireless network. Additional details of the 2-step RACH 118 are provided throughout this disclosure.

The machine learned component 210 can include one or more machine learned models or heuristics that can be used to determine which RACH procedure the UE should use to transmit data. For example, the machine learned component 210 can include weight(s) for various factors that can be used to set threshold(s) or likelihoods and/or determine factors that increase or decrease threshold(s) or likelihoods, and by how much.

In some examples, a machine learned model can determine a RACH procedure (e.g., a 2-step RACH, a 4-step RACH, actions following an unsuccessful RACH, etc.) based on a confidence level associated with a predicted outcome being above a threshold level (e.g., such that there is a likelihood above a threshold level that a 2-step RACH will be successful or unsuccessful).

In some instances, the machine learned component 210 can determine a similarity score between network condition(s), UE condition(s), and/or other conditions discussed herein and ground truth conditions representing various conditions and outcomes. Based on a similarity score of input data associated with positive outcomes (e.g., that using a 2-step RACH will be acknowledged by a base station without collision, that overall latency will be reduced, that overall reliability will be increased, etc.) or negative outcomes, the machine learned component 210 can instruct the UE to use a particular RACH procedure.

In some examples, the machine learned component 210 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the machine learned component 210 can be configured to weight different factors more heavily than other factors, and/or consider different factors in different orders. For example, the UE conditions 114 may indicate that a size of data is above a threshold (which may indicate that a probability of a successful 2-step RACH is low) while a congestion level or a time of day may indicate that a probability of a successful 2-step RACH is above a threshold. Based on the weighting of various factors in this example, the machine learned component 210 may determine to use a 2-step RACH or a 4-step RACH, for example.

In some examples, the machine learned component 210 can be trained on data received from various UE after using a 2-step RACH or a 4-step RACH. For example, training data can include the type of RACH, UE condition(s) associated with the RACH, whether network conditions were determined and if so, what the network conditions were, and the like. Further, the training data can include whether the RACH associated with the conditions was successful, which may represent a positive example. Examples where a RACH was unsuccessful may represent negative examples. The training data can represent ground truth while training a machine learned model, such that the conditions can be input to the model, which can be configured to determine which RACH to use. Feedback to the model can be provided based on whether the selected RACH was successful or unsuccessful.

In some examples, training data can be aggregated across various UEs associated with a single base station. In some examples, the data can be analyzed to identify examples where a successful RACH procedure for a first UE may have occurred within a threshold time or distance to a second UE associated with an unsuccessful RACH procedure. The machine learned component 210 may identify collisions in RACH procedures and update the model to reduce collisions based on observed network conditions. Thus, determinations of RACH procedures can be optimized for a plurality of UEs across a coverage area, which may further improve operations of a network.

The timer component 212 can include functionality to determine a delay (e.g., a back-off time period) before retrying a RACH procedure in the event a RACH is unsuccessful. For example, a RACH may be unsuccessful if a message is not received acknowledging one or more messages, depending on whether the RACH is a 2-step RACH or a 4-step RACH. For example, the timer component 212 can select a random time period to avoid any subsequent collisions. In some examples, a time period can be determined as a random value (or a value sampled between a maximum and minimum value), a fixed period, based on a number of retries, and the like.

The repeat component 214 can include functionality to determine whether to repeat a RACH procedure. The repeat component 214 can track a number of repeats and/or time periods between initiating a repeat procedure.

The fallback component 216 can include functionality to determine to fallback from a 2-step RACH to a 4-step RACH. For example, the fallback component 216 can determine when to fallback to a 4-step RACH based on one or more of network condition(s), UE condition(s), other conditions, a number of repeats, a time period between repeats, a total latency, heuristic(s), rule(s), and the like. In some examples, the fallback component 216 (and any components discussed herein) can include one or more machine learned models trained to perform a respective function.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. The memory 204, the removable storage 218 and the non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 218, and/or the non-removable storage 220 may in some cases include storage media used to transfer or distribute instructions, applications, and/or data. In some cases, the memory 204, the removable storage 218, and/or the non-removable storage 220 may include data storage that is accessed remotely, such as network-attached storage that the device 200 accesses over some type of data communications network.

In various examples, any or all of the memory 204, the removable storage 218, and/or the non-removable storage 220 may store programming instructions that, when executed, implement some or all of the function functionality described herein.

The device 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the device 200 also includes one or more wired or wireless transceiver(s) 226. For example, the transceiver(s) 226 can include a network interface card (NIC), a network adapter, a LAN adapter, or a physical, virtual, or logical address to connect to various networks, devices, or components illustrated in figures herein. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMAX, Bluetooth, infrared communication, and the like.

Figure 3:
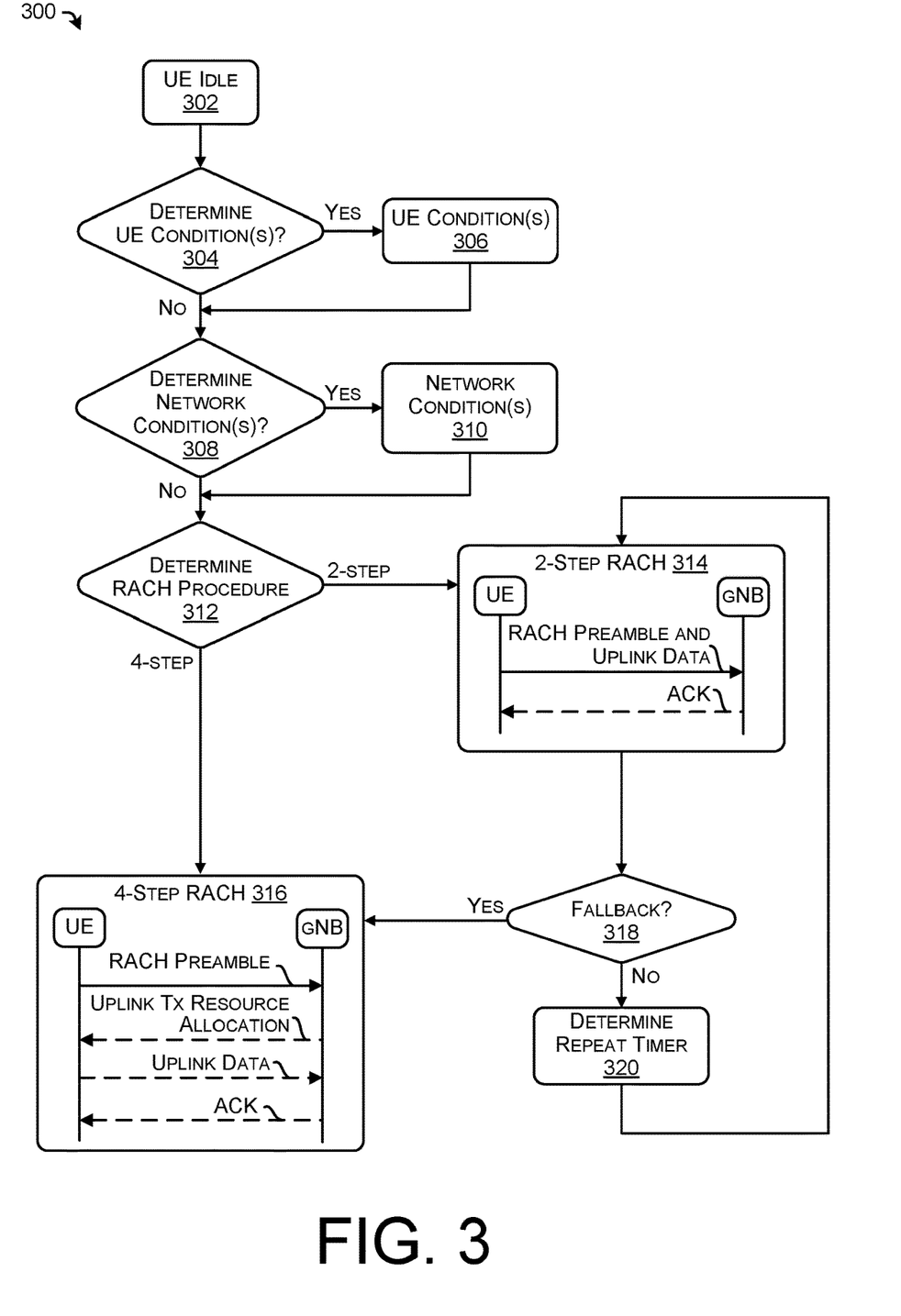
FIG. 3 illustrates an example process for determining a RACH procedure to use and subsequent operations if a RACH is not successful.
Figure 5:
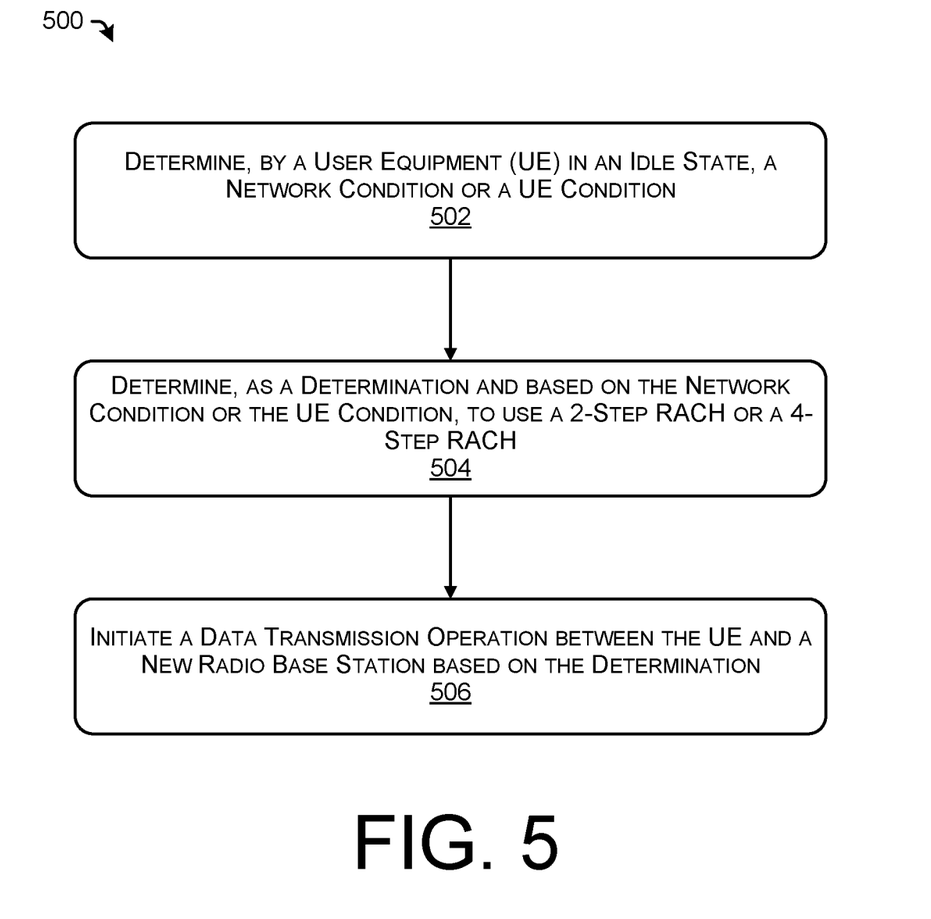
FIG. 5 illustrates an example process for determining a RACH procedure.

FIGS. 3 and 5 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 3 illustrates an example process 300 for determining a RACH procedure to use and subsequent operations if a RACH is not successful. The example process 300 can be performed by the UE 102 and/or by the device 200, as discussed herein.

At operation 302, the UE 102 can be idle. For example, the UE 102 may be in a Radio Resource Control (RRC) idle state in which no active connection exists between the UE 102 and the base station 106. However, when the UE 102 determines that data is to be exchanged with the base station 106, the process 300 can implement operation 304. The operation 304 can include determining whether to determine UE condition(s), as discussed herein. If the operation 304 determines to determine UE condition(s), the process continues to operation 306 where such conditions are determined, and the process continues to operation 308. If the operation 304 determines not to determine UE condition(s), the process continues to the operation 308.

At operation 308, the process can determine whether to determine network condition(s). If the operation 308 determines to determine network condition(s), the process continues to operation 310 where such conditions are determined, and the process continues to operation 312.

By way of example and without limitation, the operation 308 can determine that a size of data to be transmitted is below a threshold and/or a time of day is indicative of a high probability of a successful 2-step RACH, in which case the operation 308 can determine not to determine network condition(s). In some examples, the threshold associated with a data size can be based at least in part on the time of day. As can be understood, other implementations are considered and are not limited to the above example. If the operation 308 determines not to determine network condition(s), the process continues to the operation 312.

At operation 312, the process can determine which of the 2-step RACH procedure or the 4-step RACH procedure to use. As discussed herein, in some examples the operation 312 can be based at least in part on one or more machine learned models, heuristics, rules, thresholds, and the like. In some examples, the network condition(s), UE condition(s), and other information can be input to a machine learned model, which can determine a probability associated with a successful 2-step RACH procedure. In some examples, if the probability is above a threshold value the operation 312 can determine to initiate a 2-step RACH and the process can continue to a 2-step RACH operation 314. In some example, if the probability is below the threshold value the operation 312 can determine to initiate a 4-step RACH and the process can continue to a 4-step RACH operation 316.

At operation 314, the process can include initiating the 2-step RACH procedure. As illustrated, the operation 314 includes sending a first message from a UE to a base station (e.g., a gNodeB (gNB)) including a RACH preamble and uplink data. If the operation 314 is successful, the gNodeB responds with a second message acknowledging the data sent in the first message. If the 2-step RACH 314 is successful, the process 300 may end. However, if the 2-step RACH is not successful (e.g., the second message is not received by the UE), the process continues to operation 318.

At operation 318, the process can determine whether to fallback from the 2-step RACH 314 to the 4-step RACH 316. In some examples, the operation 318 can be based on one or more machine learned models, heuristics, rules, thresholds, counters, etc. For example, the operation 318 can determine to retry with a 2-step RACH a number of times before falling back to the 4-step RACH 316.

In some examples, if the operation 318 determines to fallback to the 4-step RACH 316, the operation 318 can include determining a delay period, if any, before initiating the 4-step RACH 316.

If the operation 318 determines not to fallback, the process continues to operation 320, which can include tracking a number of repeat RACH procedures and/or determining a time period to wait before initiating the 2-step RACH 314. In some examples, the operation 320 can determine a random delay period between a minimum and maximum time, which may decrease a probability of subsequent collisions.

In some examples, the operation 320 can determine a delay time period based at least in part on a priority of data to be transmitted. In some cases, such a priority can be based at least in part on a data type (e.g., SMS, MMS, voice, video, data, etc.), device type (e.g., URLLC device, IoT device, smartphone, autonomous vehicle, etc.), subscriber level, and the like.

The process may wait for a period of time as determined in the operation 320 and can continue to the operation 314 to initiate the 2-step RACH 314. In some examples, the process 300 can continue until data is successfully transmitted by one of the 2-step RACH 314 or the 4-step RACH 316, or when some other stopping condition is reached (e.g., a number of retries is reach, data associated with the transmission become stale or deprioritized below a threshold, etc.).

Figure 4:
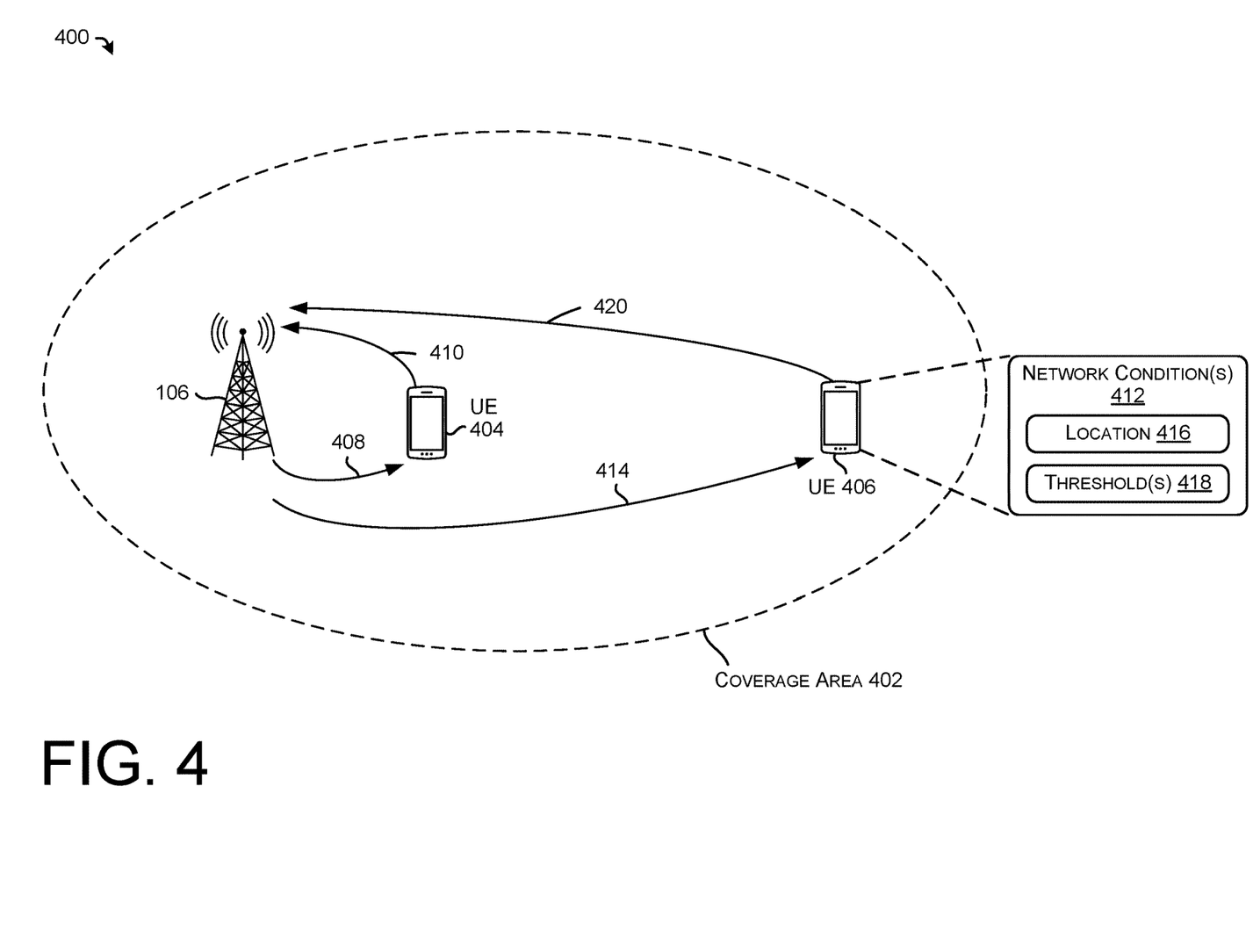
FIG. 4 illustrates an example of determining a RACH procedure based on a location of a UE in an environment.

FIG. 4 illustrates an example 400 of determining a RACH procedure based on a location of a UE in an environment.

The example 400 includes a coverage area 402 associated with the base station 106. The example 400 includes a UE 404 associated with a first location in the coverage area 402 and a UE 406 associated with a second location in the coverage area 402. As illustrated, a first distance between the UE 404 and the base station 106 can be less than a second distance between the UE 406 and the base station 106. In some examples, the UEs 404 and 406 can correspond to the UE 102 and/or the device 200, as discussed herein.

For the purpose of discussion, the UE 404 may be initiating a RACH procedure (e.g., either a 2-step RACH or a 4-step RACH) with the base station 106. The RACH procedure associated with the UE 404 can be illustrated by signals 408 and 410. At substantially the same time, the UE 406 may be initiating a RACH selection/determination process, as discussed herein.

In some examples, the UE 406 can determine to determine network condition(s) 412, as discussed herein. In some examples, the network condition(s) 412 can correspond to the network condition(s) 112 discussed with respect to FIG. 1. In some examples, to determine whether to determine network conditions, the UE 406 can determine that a data size is above a data threshold or that a time of day or location of the UE is suggests it may be beneficial to determine the network condition(s) 412.

In such a case, the UE 406 can listen to a physical RACH channel to determine the network condition(s) 412. For example, the UE 406 may receive a signal 414 transmitted by the base station 106 from which the UE 406 may estimate or otherwise determine a location 416 of the UE 406 in the coverage area 402.

For example, the UE 406 can estimate or otherwise determine a location 416 associated with the UE 102 in the environment based at least in part on radio signal timing advance (TA) data. In some examples, the UE 406 can determine an amount of time associated with a signal propagating from the base station 106 to the UE 406. The UE 406 can receive timing advance data over time to estimate a position of the UE 406 in the environment. In some examples, the UE 406 can receive timing advance data from other base stations in the environment to triangulate or otherwise determine a location of the UE in the environment.

Further, the UE 406 can determine the location 416 based at least in part on GPS data, which may be used to determine a RACH procedure to use, as discussed herein.

The UE 406 can determine threshold(s) 418 based at least in part on the location 416. In some cases, the threshold(s) can be used to determine a level of congestion on the physical RACH above which the UE 406 may determine to use a 4-step RACH instead of a 2-step RACH. For example, if the location 416 is indicative of a relatively large distance between the base station 106 and the UE 406 the threshold 418 can be lower than a case where the UE 404 is relatively closer to the base station 106. That is, the threshold 418 can be inversely proportional to the size of the distance between the UE 406 and the base station 106, and as the distance increases, the threshold level of congestion sensed by the UE 404 when determining a RACH procedure may decrease.

By way of example and without limitation, in a case where the UE 404 and the UE 406 are attempting a RACH procedure at substantially the same time, the signal 410 sent by the UE 404 and a signal 420 sent by the UE 406 may result in a collision and one or both of the RACH procedures initiated by the UE 404 and 406 may fail. However, a power level of the signal 410 may be such that the signal 410 may not be detectable by the UE 406. Accordingly, the techniques discussed herein contemplate adjusting or otherwise determining one or more thresholds for determining a RACH procedure based on a location of a UE in the coverage area 402.

In some examples, a threshold may not be expressly determined but may be learned by a machine learned model when determining when to determine network conditions, as discussed here. Accordingly, the techniques present efficient techniques for determining network condition(s) to reduce latency and increase energy efficiency for a UE, as discussed herein.

FIG. 5 illustrates an example process 500 for determining a RACH procedure. The example process 500 can be performed by the UE 102 and/or by the device 200, as discussed herein.

At operation 502, the process can include determining, by a user equipment (UE) in an idle state, a network condition or a UE condition. In some examples, a network condition can include a level of congestion associated with a physical RACH channel, which the UE can determine by listening to traffic or noise in the physical RACH. Additional examples of network conditions are discussed throughout this disclosure. In some examples, a UE condition can include a size of data to be transmitted via a RACH procedure. Additional examples of UE conditions are discussed throughout the disclosure. In some examples, the operation 502 can include an initial determination whether to determine one of the network conditions or the UE conditions. For example, the operation of determining network conditions may be skipped in the event a time of day indicates that a probability of a successful 2-step RACH is above a threshold.

At operation 504, the process can include determining, as a determination and based on the network condition or the UE condition, to use a 2-step RACH or a 4-step RACH. In some examples, the network condition, the UE condition, and/or other conditions can be input to one or more machine learned models, heuristics, rules, threshold, or other decision metrics to determine whether to use a 2-step RACH or a 4-step RACH. Additional details of selecting or determining to use a particular RACH procedure are discussed throughout this disclosure.

At operation 506, the process can include initiating a data transmission operation between the UE and a new radio base station based on the determination. For example, in the case where a 2-step RACH procedure is selected as a RACH procedure to use, the operation 506 can include initiating the 2-step RACH procedure by sending a message from the UE to the new radio base station including a RACH preamble and uplink data. In the event the RACH procedure is not successful, the operation 506 can include repeating the particular RACH procedure, delaying a repeat for a particular amount of time, and/or falling back to a different RACH procedure.

Thus, the techniques discussed herein describe efficient RACH procedure determination for wireless devices in a wireless network.

Conclusion

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   determining, by a user equipment (UE) in an idle state, a network condition and a UE condition;
   determining, based at least in part on the network condition and the UE condition, to use a two-step random access channel (RACH) procedure or a four-step RACH procedure, including:
      inputting the network condition and the UE condition to a machine learned model, wherein the machine learned model handles each of the network condition and the UE condition as a feature, and for each feature, calculates a weight and a similarity score to a ground truth, and
      receiving, from the machine learned model and based at least in part on the network condition and the UE condition, a selection of the two-step RACH procedure or the four-step RACH procedure; and
   initiating a data transmission operation between the UE and the base station based at least in part on the selection,
   wherein the machine learned model is trained on success data for use of the two-step RACH procedure and the four-step RACH procedure across multiple UEs.

2. The method of claim 1, wherein the network condition comprises estimated distance between the UE and the NR base station or a level of congestion in a physical RACH channel.

3. The method of claim 1, wherein determining the network condition and the UE condition comprises determining the UE condition, wherein the UE condition comprises at least one of a size of data to be transmitted during the data transmission operation, a device type, an application associated with data to be sent, or a charge level associated with the UE.

4. The method of claim 1, wherein:
   the two-step RACH procedure comprises:
      a first message from the UE to the NR base station comprising a first RACH preamble and first content data; and
      a second message from the NR base station to the UE comprising a first acknowledgement of the first message; and
   the four-step RACH procedure comprises:
      a third message from the UE to the NR base station comprising a second RACH preamble;
      a fourth message from the NR base station to the UE comprising an uplink transmission resource allocation;
      a fifth message from the UE to the NR base station comprising second content data; and
      a sixth message from the NR base station to the UE comprising a second acknowledgment of receiving the fifth message.

5. The method of claim 1, wherein determining to use the two-step RACH procedure or the four-step RACH procedure comprises determining to use the two-step RACH procedure, the method further comprising:
   determining that the two-step RACH procedure was unsuccessful; and
   determining at least one of:
      a back-off time period to repeat the two-step RACH procedure; or
      a number of retries to repeat the two-step RACH procedure.

6. The method of claim 1, further comprising:
determining, based at least in part on the machine learned model, to determine the network condition.

7. The method of claim 1, wherein the UE is configured for standalone communication with the NR base station.

8. A user equipment (UE) comprising:
one or more processors; and
one or more non-transitory computer-readable media storing computer-executable instructions that, when executed, cause the one or more processors to perform operations comprising:
determining at least one of a network condition or a UE condition, wherein determining the at least one of the network condition or the UE condition comprises determining the UE condition, wherein the UE condition comprises at least a charge level associated with a battery of the UE;
determining, based at least in part on the at least one of the network condition or the UE condition, to use a two-step random access channel (RACH) procedure or a four-step RACH procedure, wherein the determining includes inputting the at least one of the network condition or the UE condition to a machine learned model, wherein the machine learned model handles each of the network condition and the UE condition as a feature, and for each feature, calculates a weight and a similarity score to a ground truth; and
initiating a data transmission operation between the UE and a new radio (NR) base station based at least in part on the determining,
wherein the machine learned model is trained on success data for use of the two-step RACH procedure and the four-step RACH procedure across multiple UEs.

9. The UE of claim 8, wherein determining the at least one of the network condition or the UE condition further comprises determining the network condition, wherein the network condition comprises at least one of a level of congestion in a physical RACH channel or a time of day.

10. The UE of claim 8, wherein the UE condition further comprises a device type of the UE a size of data to be transmitted during the data transmission operation, or an application associated with data to be sent.

11. The UE of claim 8, wherein determining to use the two-step RACH procedure or the four-step RACH procedure comprises determining to use the two-step RACH procedure, the operations further comprising:
determining that the two-step RACH procedure was unsuccessful; and
determining at least one of:
a back-off time period to repeat the two-step RACH procedure;
a number of retries to repeat the two-step RACH procedure; or
a second determination to use the four-step RACH procedure.

12. The UE of claim 8, the operations further comprising:
determining, based at least in part on a time of day or on a machine learned model, whether to determine the network condition.

13. The UE of claim 8, wherein the UE is configured for standalone communication with the NR base station.

14. The UE of claim 8, the operations further comprising:
determining that the UE is in an idle state;
wherein determining the at least one of the network condition or the UE condition is based at least in part on the UE being in an idle state.

15. One or more non-transitory computer-readable media storing computer-executable instructions that, when executed, cause one or more processors to perform operations comprising:
determining that a UE is in an idle state;
determining, based at least in part on the UE being in the idle state, a UE condition;
determining, based at least in part on machine learned model, to determine a network condition;
inputting the network condition and the UE condition to the machine learned model, wherein the machine learned model handles each of the network condition and the UE condition as a feature, and for each feature, calculates a weight and a similarity score to a ground truth;
receiving, from the machine learned model and based at least in part on the network condition and the UE condition, a selection between a two-step random access channel (RACH) procedure or a four-step RACH procedure; and
initiating a data transmission operation between the UE and a new radio (NR) base station based at least in part on the selection,
wherein the machine learned model is trained on success data for use of the two-step RACH procedure and the four-step RACH procedure across multiple UEs.

16. The one or more non-transitory computer-readable media of claim 15, wherein the network condition comprises at least one of a level of congestion in a physical RACH channel, an estimated distance between the UE and the NR base station, or a time of day.

17. The one or more non-transitory computer-readable media of claim 15, wherein the UE condition comprises at least one of a size of data to be transmitted during the data transmission operation, a device type, an application associated with data to be sent, or a charge level associated with the UE.

18. The one or more non-transitory computer-readable media of claim 15, wherein the operations further comprise:
determining that the two-step RACH procedure was unsuccessful; and
determining at least one of:
a back-off time period to repeat the two-step RACH procedure; or
a number of retries to repeat the two-step RACH procedure.

* * * * *